United States Patent
Wang et al.

(10) Patent No.: US 11,379,021 B2
(45) Date of Patent: *Jul. 5, 2022

(54) HEAT DISSIPATION MODULE

(71) Applicant: Acer Incorporated, New Taipei (TW)

(72) Inventors: Yung-Chih Wang, New Taipei (TW); Cheng-Wen Hsieh, New Taipei (TW); Wen-Neng Liao, New Taipei (TW)

(73) Assignee: Acer Incorporated, New Taipei (TW)

( * ) Notice: Subject to any disclaimer, the term of this patent is extended or adjusted under 35 U.S.C. 154(b) by 175 days.

This patent is subject to a terminal disclaimer.

(21) Appl. No.: 16/706,841

(22) Filed: Dec. 9, 2019

(65) Prior Publication Data

US 2020/0110450 A1 Apr. 9, 2020

Related U.S. Application Data

(62) Division of application No. 15/206,499, filed on Jul. 11, 2016, now Pat. No. 10,642,322.

(30) Foreign Application Priority Data

Jul. 15, 2015 (TW) .................................. 104122924
Jan. 27, 2016 (TW) .................................. 105102477

(51) Int. Cl.
*G06F 1/20* (2006.01)

(52) U.S. Cl.
CPC ........ *G06F 1/203* (2013.01); *G06F 2200/201* (2013.01)

(58) Field of Classification Search
CPC .............. G06F 1/203; G06F 2200/201; F28D 15/0275; F28D 15/043; F28D 15/0266; F28F 1/006; F28F 13/08; F28F 3/086; H05K 7/20336
See application file for complete search history.

(56) References Cited

U.S. PATENT DOCUMENTS

| | | | | |
|---|---|---|---|---|
| 3,817,321 A | * | 6/1974 | VON Cube | H01L 24/01 165/104.22 |
| 7,007,746 B2 | * | 3/2006 | Wu | F28D 15/043 165/104.26 |
| 7,980,295 B2 | * | 7/2011 | Takamatsu | F28D 15/043 165/104.26 |
| 9,305,860 B2 | * | 4/2016 | Hsieh | H01L 23/427 |
| 10,018,430 B2 | * | 7/2018 | Kandlikar | H01L 23/473 |
| 10,642,322 B2 | * | 5/2020 | Wang | G06F 1/203 |

(Continued)

*Primary Examiner* — Gordon A Jones
(74) *Attorney, Agent, or Firm* — JCIPRNET (57) ABSTRACT

A heat dissipation module suitable for an electronic device is provided. The electronic device has a heat source. The heat dissipation module includes an evaporator and a pipe assembly. An internal space of the evaporator is divided into a first space and a second space, and the heat source is thermally contacted with the second space. The pipe assembly is connected to the evaporator to form a loop. A working fluid is filled in the loop. The working fluid in liquid receiving heat from the heat source is transformed into vapor and flows to the pipe assembly. Then, the working fluid in vapor is transformed into liquid by dissipating heat in the pipe assembly and flows to the first space of the evaporator. The working fluid in liquid is stored in the first space and is used for supplying to the second space.

9 Claims, 11 Drawing Sheets

(56) References Cited

U.S. PATENT DOCUMENTS

| | | | | |
|---|---|---|---|---|
| 2003/0051859 A1* | 3/2003 | Chesser | ............... | F28D 15/043 |
| | | | | 165/46 |
| 2010/0018676 A1* | 1/2010 | Yang | ................... | H01L 23/473 |
| | | | | 165/104.19 |
| 2012/0018131 A1* | 1/2012 | Chang | ................ | F28D 15/0266 |
| | | | | 165/104.21 |
| 2012/0043060 A1* | 2/2012 | Wang | ................. | F28D 15/0266 |
| | | | | 165/104.26 |

\* cited by examiner

HEAT DISSIPATION MODULE

CROSS-REFERENCE TO RELATED APPLICATION

This application is a divisional application of and claims the priority benefit of U.S. application Ser. No. 15/206,499, filed on Jul. 11, 2016, now allowed, which claims the priority benefit of Taiwan application serial no. 105102477, filed on Jan. 27, 2016, and Taiwan application serial no. 104122924, filed on Jul. 15, 2015. The entirety of each of the above-mentioned patent applications is hereby incorporated by reference herein and made a part of this specification.

BACKGROUND

1. Technical Field

The disclosure relates to a heat dissipation module.

2. Description of Related Art

As the industries of science and technology continuously advance in recent years, electronic devices, such as notebook computers, personal digital assistants (PDAs), and smart phones, are used more and more frequently in our daily life. Some electronic elements in the electronic devices may generate heat when they are operating, and the generated heat may influence the performance of the electronic devices. Therefore, it is common to dispose a heat dissipation module or a heat dissipation member, such as a heat dissipation fan, a heat dissipation adhesive material, or a heat dissipation pipe, in the electronic device so as to dissipate the heat generated by the electronic elements outside the electronic devices.

Among the heat dissipation modules, the heat dissipation fan is capable of effectively dissipating heat outside, but it consumes a significant amount of power, and is heavier and requires more space. Therefore, it is less preferable to install the heat dissipation fan in an electronic device pursuing a thinner and a lighter design. Besides, the heat dissipation fan may generate noise that influences the communication function provided by the electronic device. Furthermore, to allow the heat dissipation fan to dissipate heat through convection, the case of the electronic device needs to provide an opening, but providing an opening may reduce the mechanical strength of the electronic device.

As for the heat dissipation adhesive material, such material may absorb the heat of the electronic elements and reduce surface temperature. In addition, the cost and space requirements of the heat dissipation adhesive material are lower, so the heat dissipation adhesive material can be broadly used in the electronic device. However, it is difficult for the heat dissipation adhesive material to further dissipate the heat outside via other components, so the heat dissipation effect of the heat dissipation adhesive material is limited.

The heat dissipation pipe is able to transfer the heat of the electronic elements to another plate element. However, due to lack of convection, the heat dissipation effect of the heat dissipation pipe is limited. Accordingly, the heat dissipation pipe may be used with an evaporator and a condenser to form a loop, and a transformable heat transferring medium capable of transforming between two phases (e.g., liquid phase and vapor phase) by absorbing or releasing heat may circulate in the heat dissipation pipe to absorb heat in the evaporator and release heat in the condenser, thereby transferring the heat from the electronic elements to the outside. Nevertheless, the heat transferring medium only circulates in the loop through its own transformation, so the effect of circulation is less desirable. Thus, the effect of heat dissipation of the heat transferring medium is limited.

SUMMARY

The disclosure provides a heat dissipation module providing a preferable flowing efficiency and heat dissipation effect when a working fluid flows in a loop formed by an evaporator and a pipe assembly.

A heat dissipation module according to an embodiment of the disclosure is suitable for an electronic device is provided. The electronic device has a heat source. The heat dissipation module includes an evaporator and a pipe assembly. An internal space of the evaporator is divided into a first space and a second space, and the heat source is thermally contacted with the second space. The pipe assembly is connected to the evaporator to form a loop. A working fluid is filled in the loop. The working fluid in liquid receiving heat from the heat source transforms into the working fluid in vapor and flows to the pipe assembly. Then, the working fluid in vapor transforms into the working fluid in liquid by dissipating heat in the pipe assembly and flows to the first space of the evaporator. The working fluid in liquid is stored in the first space and is used for supplying to the second space.

Based on the above, in the heat dissipation module, the evaporator and the pipe assembly are combined to form the closed loop, and the working fluid is filled into the loop, so that the heat is absorbed and dissipated through transformation of the working fluid.

The cavity of the evaporator is divided into the first space and the second space. The heat source is only in thermal contact with the second space, so only the working fluid in liquid in the second space is transformed due to absorption of heat, and the first space may still store the working fluid in liquid, so as to guide and supply the working fluid in liquid to the second space for heat absorption.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings.

Wherever possible, the same reference numbers are used in the drawings and the description to refer to the same or like parts.

Figure 1:
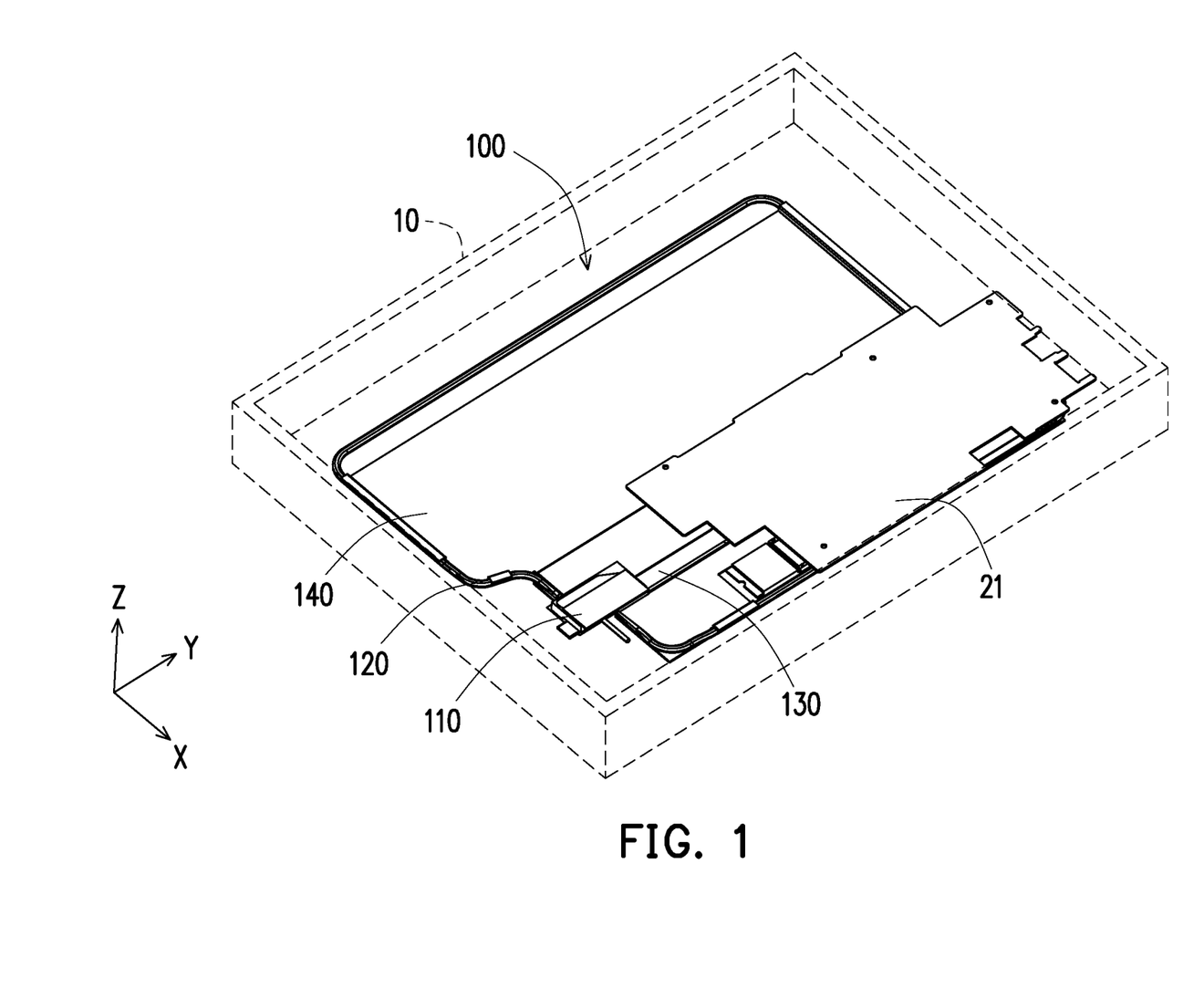
FIG. 1 is a schematic view illustrating that a heat dissipation module according to an embodiment of the invention is applied in an electronic device.
Figure 2:
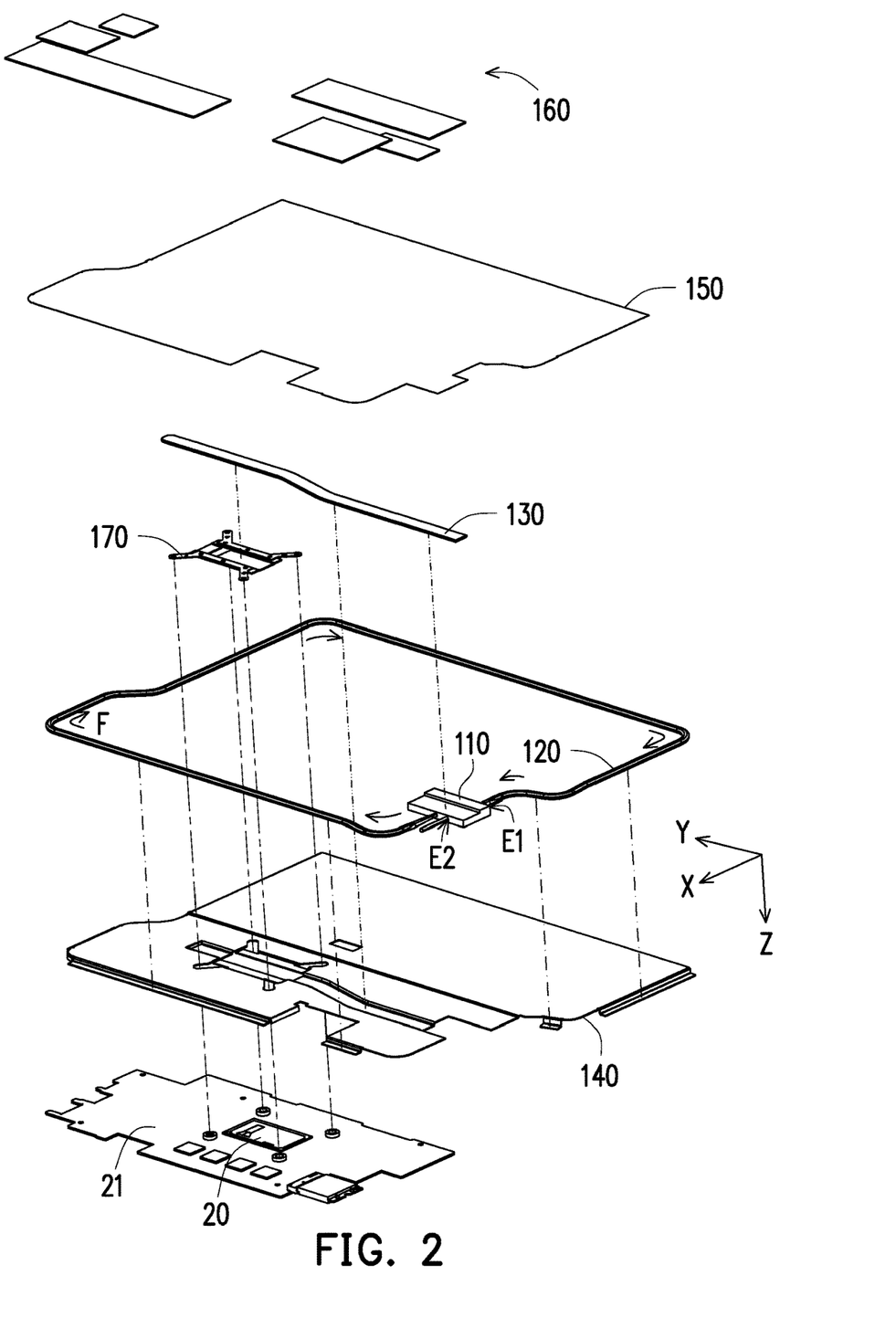
FIG. 2 is an exploded view of the heat dissipation module of FIG. 1.

FIG. 1 is a schematic view illustrating that a heat dissipation module according to an embodiment of the invention is applied in an electronic device. Here, only a part of the electronic device is shown for an illustrative purpose. In addition, Cartesian coordinates are provided in FIG. 1 as well as subsequent drawings for the convenience of identifying directions of components. FIG. 2 is an exploded view of the heat dissipation module of FIG. 1. Referring to FIGS. 1 and 2, in this embodiment, a heat dissipation module 100 is suitable for an electronic device, such as a mobile electronic device like a notebook computer. Here, a case 10 of the electronic device is shown for an illustrative purpose. The heat dissipation module 100 is disposed in the case 10, and transfers heat generated by electronic elements in the electronic device to the case 10 to be dissipated by utilizing a thermal contact effect of the structure, thereby dissipating the heat. Further details in this regard will be described in the following.

The electronic device has a heat source 20. The heat source 20 may be a processor or a display chip, for example, that is disposed on a circuit board 21. The heat dissipation module 100 includes an evaporator 110 and a pipe assembly 120. The evaporator 110 has an inlet E1 and an outlet E2. Two opposite ends of the pipe assembly 120 are connected to the inlet E1 and the outlet E2 to form a closed loop with the evaporator 110. A working fluid F is filled in the loop, such that heat is absorbed and dissipated through phase transformation of the working fluid F. Here, an arrow sign is used to indicate a flow direction of the working fluid F.

In this embodiment, the heat dissipation module 100 further includes a heat pipe 130, heat dissipation members 140 and 150, heat conductive pads 160, and a pressing member 170. The pressing member 170 is configured to lock the heat dissipation member 140 and the circuit board 21 together. The heat pipe 130 is disposed on the pressing member 170 and the heat dissipation member 140, so that one end of the heat pipe 130 is thermally contacted with the heat source 20, and the other end of the heat pipe 130 is connected to the evaporator 110. Accordingly, heat generated by the heat source 20 may be transferred to the evaporator 110 through the heat pipe 130.

Specifically, after the heat from the heat pipe 130 is transferred to the evaporator 110, the working fluid F therein is heated and transformed (e.g., from a liquid phase to a vapor phase), and flows in the loop. Once the working fluid F passes through a position where the pipe assembly 120 and the heat dissipation member 140 are connected, the working fluid F may be transferred to the heat dissipation member 140 utilizing the heat. Namely, the heat dissipation member 140 may be considered as a condensing end of the loop that transforms the working fluid F again (e.g., from the vapor phase to the liquid phase), so that the working fluid F may flow back to the evaporator 110 along the loop. Accordingly, by circulative transformation of the working fluid F in the loop, the evaporator 110 and the pipe assembly 120 are able to absorb and dissipate heat. Moreover, the heat dissipation member 150 is stacked on the heat dissipation member 140 and come into contact with the case 10 through a plurality of the heat conductive pads 160. Accordingly, the heat dissipation members 140 and 150 are able to absorb heat from the pipe assembly 120 and transfer the heat to the case 10 through the heat conductive pads 160. Consequently, the heat may be eventually dissipated out of the electronic device.

Figure 3:
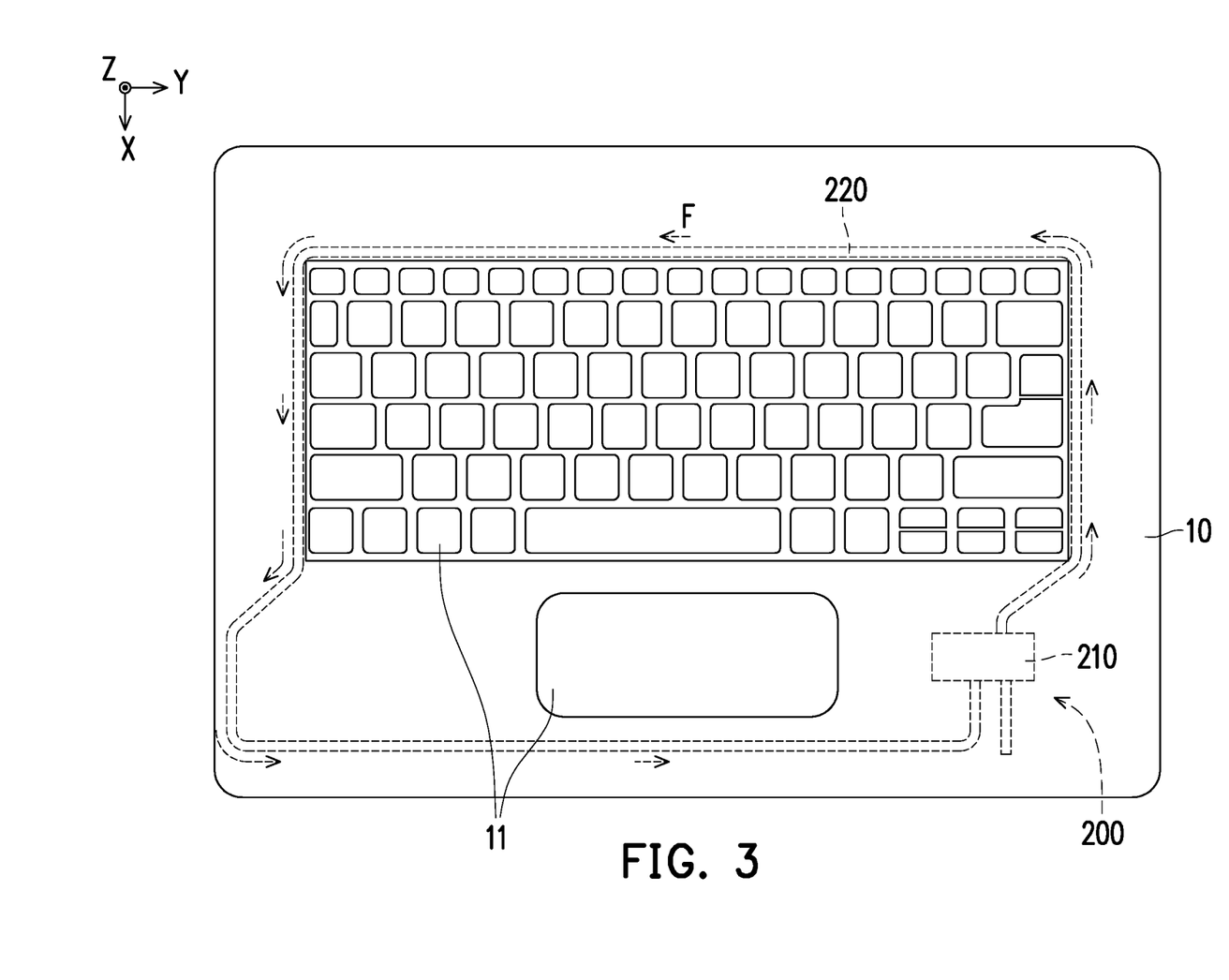
FIG. 3 is a partial top view illustrating a heat dissipation module according to another embodiment of the invention.
Figure 4:
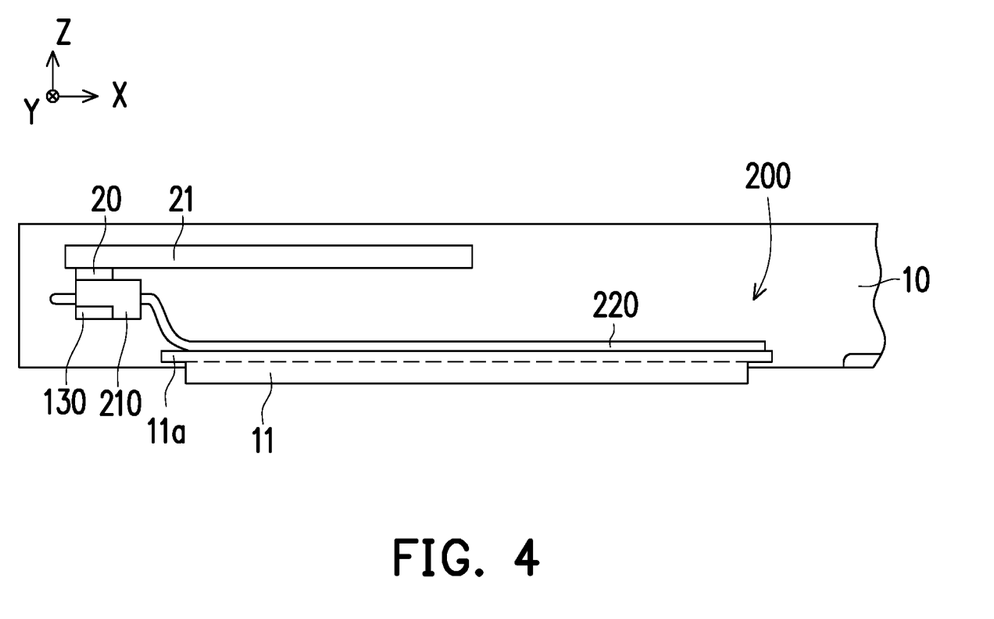
FIG. 4 is a partial side view illustrating the heat dissipation module of FIG. 3.

FIG. 3 is a partial top view illustrating a heat dissipation module according to another embodiment of the invention. FIG. 4 is a partial side view illustrating the heat dissipation module of FIG. 3. Referring to FIGS. 3 and 4, what differs from the previous embodiment is that a pipe assembly 220 of a heat dissipation module 200 of this embodiment substantially surrounds an input assembly 11. More specifically, the input assembly 11 has an element 11a, such as a support member of a touch pad or a keyboard module, and the element 11a is formed of a thermally conductive material (e.g., metal). Therefore, by having the pipe assembly 220 thermally contact the element 11a, the heat may be transferred to the element 11a to be dissipated out of the electronic device. Namely, the working fluid F in the loop substantially absorbs the heat from the heat source 20 at the evaporator 210, and then the heat is dissipated by having the pipe assembly 220 thermally contact the element 11a.

Similar to the previous embodiment, the heat source 20 transfers the heat to the evaporator 210 through the heat pipe 130. However, the invention does not intend to impose a limitation as to how the heat is transferred. In another embodiment not shown herein, the heat source may directly and physically contact the evaporator.

Based on the above, the heat dissipation modules 100 and 200 according to the embodiments of the invention are able to employ a structural member or an appearance member of the electronic device as a medium to dissipate the heat.

Figure 5:
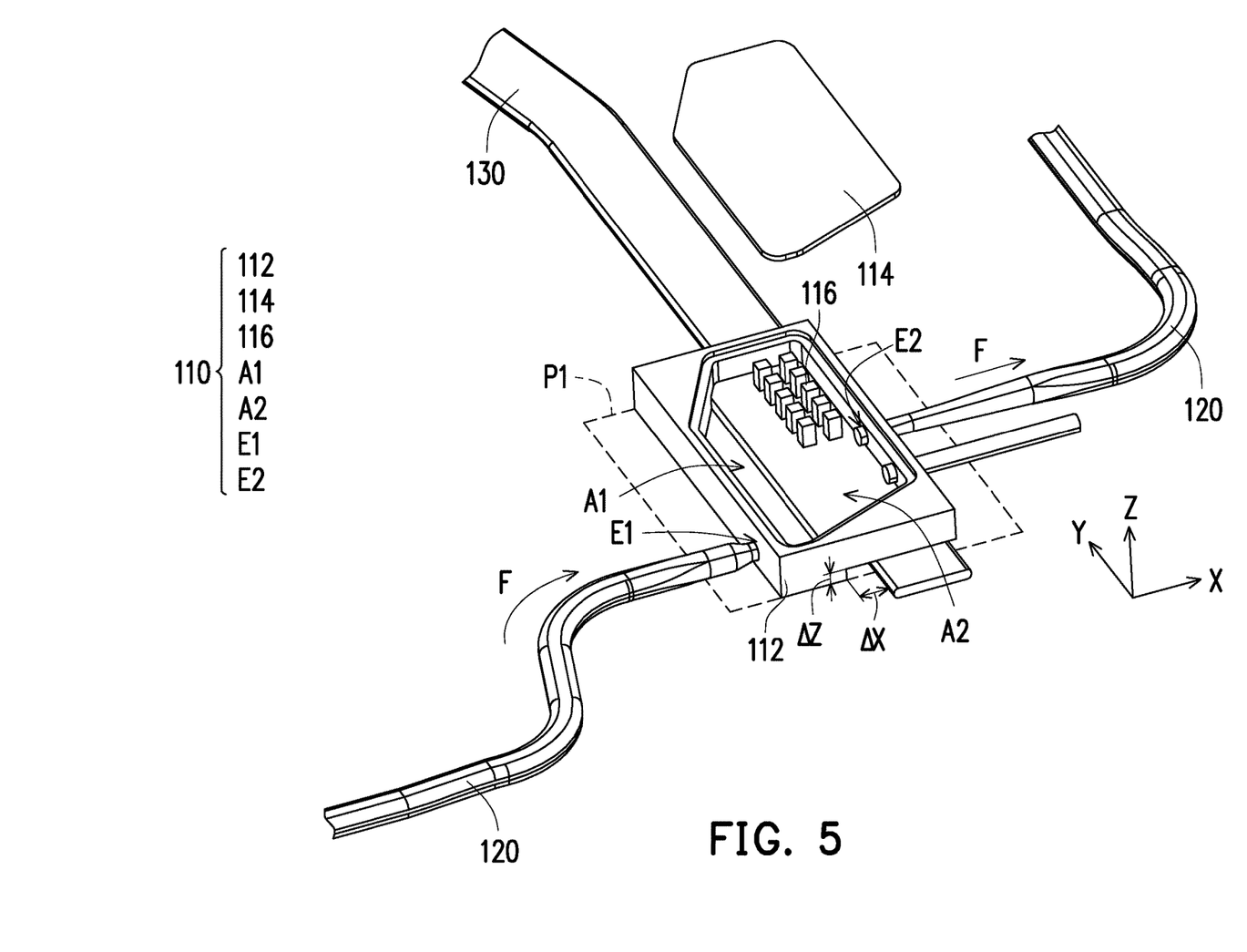
FIG. 5 is a schematic view illustrating a part of components of the heat dissipation module of FIG. 2.

FIG. 5 is a schematic view illustrating a part of components of the heat dissipation module of FIG. 2. Referring to FIG. 5, in this embodiment, the evaporator 110 includes a base 112, an upper cover 114, and a plurality of heat conductive pillars 116. In addition, the base 112 and the upper cover 114 are combined to form a cavity, such that the working fluid F may flow and undergoes transformation in the cavity. It should be noted that, using a virtual plane P1 (which may be considered as an X-Y plane or a plane parallel to the X-Y plane) where the base 112 is located as reference, there is a height difference between the inlet E1 and the outlet E2 of the evaporator 110. Namely, there a difference along a Z-axis.

More specifically, the internal cavity of the evaporator 110 may be substantially divided into a second space (evaporation space) A2 and a first space (supply space) A1. In addition, there is a height difference $\Delta Z$ between the first space A1 and the second space A2 that are in a step-like configuration. In addition, the outlet E2 is adjacent to the evaporation space A2, and the inlet E1 is adjacent to the supply space A1. As shown in FIG. 2, one end of the heat pipe 130 is in thermal contact with the heat source 20, and the other end of the heat pipe 130 is connected to an external part of the evaporator 110 and located below the second space A2. In this embodiment, an external part and an internal part of the base 112 are consistently in a step-like structure. Namely, there is the same height difference ΔZ in the external part and the internal part of the base 112. Thus, FIG. 5 only marks the height difference ΔZ for the external part. With the height difference, the heat pipe 130 is allowed to come into contact with a recessed structure of the external part of the evaporator 110.

Moreover, a gap ΔX is provided between the other end of the heat pipe 130 and the external part of the evaporator 110 in the first space A1, so as to insulate heat to a certain extent. Namely, the heat transferred by the heat pipe 130 is able to be converged at the second space A2, thereby maintaining the working fluid F of the first space A1 to be in the liquid phase. Furthermore, the heat conductive pillars 116 are disposed in the second area A2, so as to increase a contact area with the working fluid F. Accordingly, the working fluid F in the second space A2 is able to smoothly absorb heat and be transferred from the liquid phase to the vapor phase. In addition, due to a characteristic of plateau of the second space A2 relative to the first space A1, the working fluid F in vapor is unable to flow out from the inlet E1. In addition, the working fluid F that is not heated and is in a liquid phase fills the inlet E1 and the first space A1. Therefore, the working fluid F in vapor is only discharged out of the evaporator 110 from the outlet E2, whereas the working fluid F in liquid continuously flows from the first space A1 to the second space A2 to absorb heat. Such arrangement effectively prevents the working fluid F in vapor from flowing back and drives the working fluid F to flow in the loop according to the direction shown in the drawings.

Figure 6:
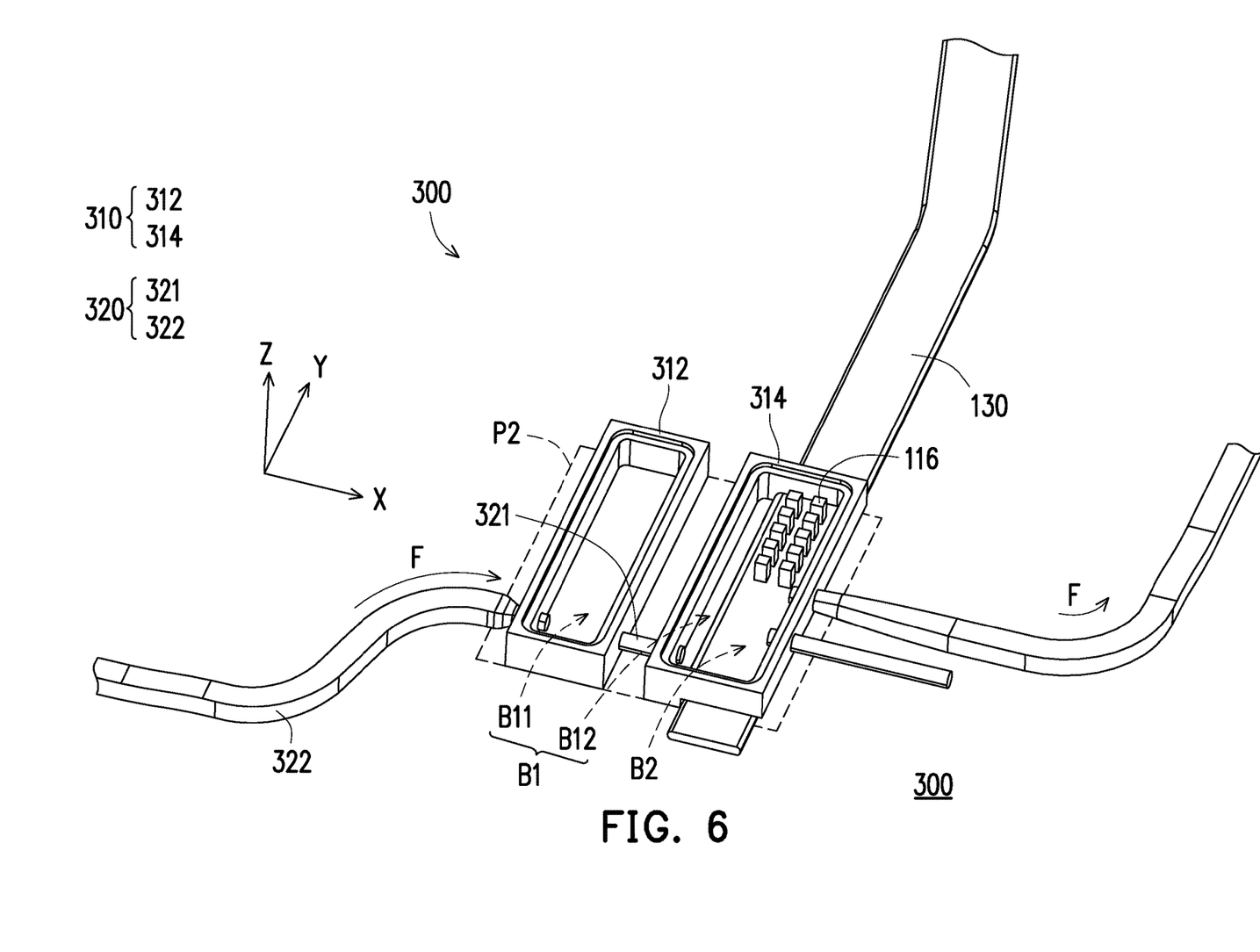
FIG. 6 is a schematic partial view illustrating a heat dissipation module according to another embodiment of the invention.

FIG. 6 is a schematic partial view illustrating a heat dissipation module according to another embodiment of the invention. Here, the upper cover of the evaporator shown in FIG. 2 is omitted to illustrate structural features therein. Referring to FIG. 6, in this embodiment, an evaporator 310 of the heat dissipation module 300 includes a first sink 312 and a second sink 314 located on a virtual plane P2. In addition, a cavity space of the first sink 312 substantially has a portion B11 of a first space (supply space) B1, and a cavity space of the second sink 314 substantially includes another portion B12 of the first space (supply space) B1 and a second space (evaporation space) B2. In addition, there is a height difference between the portion B12 and the second space B2 along the Z-axis, showing a step-like configuration. A pipe assembly 320 includes a first pipe member 321 and a second pipe member 322 respectively connected between the first sink 312 and the second sink 314. Specifically, the first pipe member 321 is connected between an outlet of the first sink 312 and an inlet of the second sink 314, the second pipe member 322 is connected between an outlet of the second sink 314 and an inlet of the first sink 312.

In other words, the working fluid F in liquid in this embodiment substantially flows from the first pipe member 321 to the second sink 314 after flowing from the second pipe member 322 to the first sink 312. Consequently, the different portions B11 and B12 become the supply space (the first space B1) of the working fluid F in liquid that supplies the working fluid F in liquid to the evaporation space (second space B2) to absorb heat. Namely, the working fluid F in liquid fills the first pipe member 321 and the first space B1, so the portion B11 of the first space B1 in the first sink 312 may be considered as a front station (or a buffer space) that supplies the working fluid F in liquid to the portion B12 to ensure a sufficient amount of the working fluid F in liquid to be driven to the portion B12 and the second space B2 (evaporation space). Accordingly, the working fluid F in vapor flows from the second space B2 of the second sink 314 toward the second pipe member 322, whereas the working fluid F in liquid flows from the second pipe member 322 to the first sink 312 (i.e., the portion B11), and flows to the portion B12 of the second sink 314 through the first pipe member 321.

In addition, the heat pipe 130 and the heat conductive pillars 116 of this embodiment are the same as those in the previous embodiments. Thus, details in this regard will not be repeated in the following.

Figure 7:
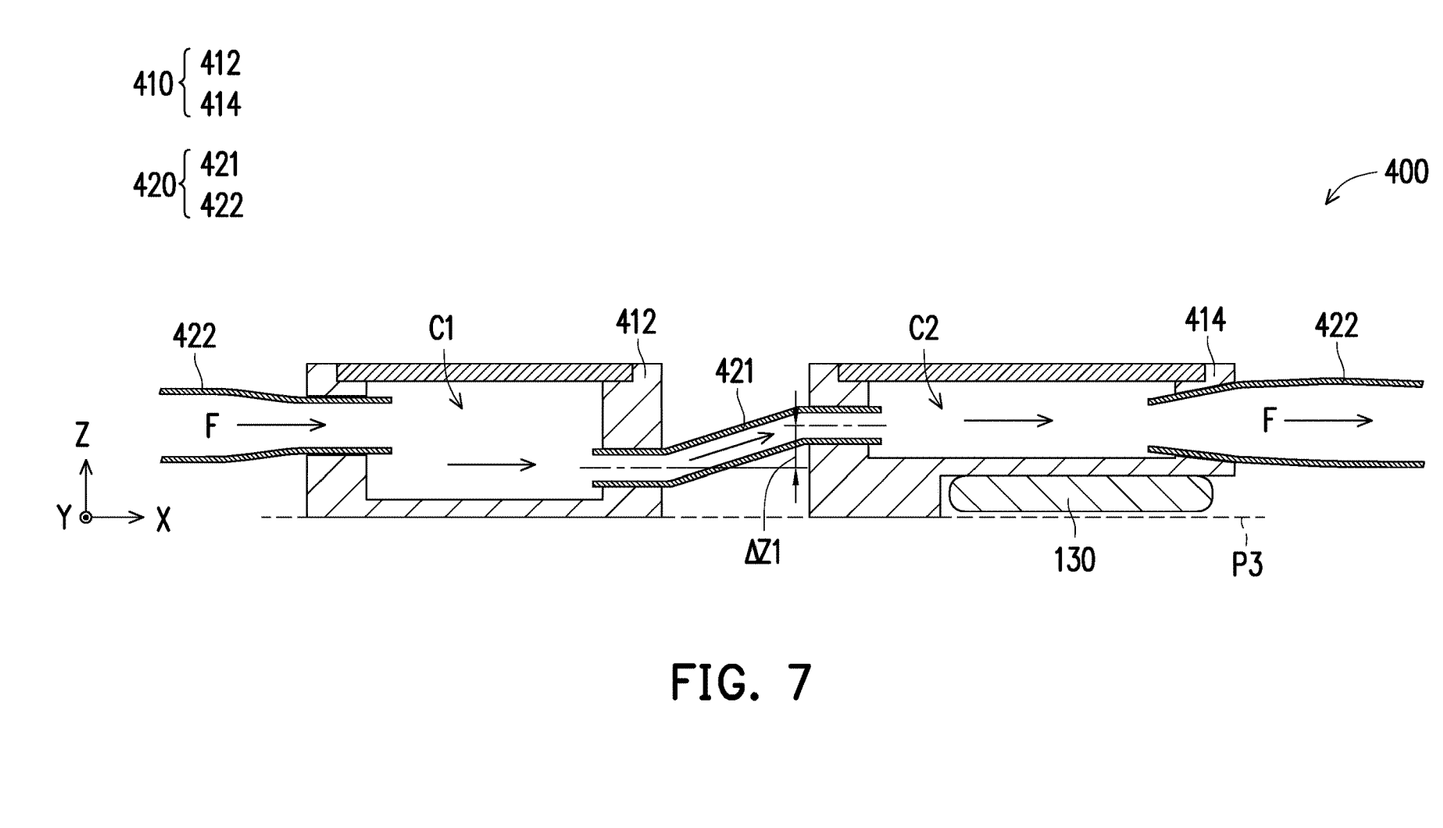
FIG. 7 is a partial schematic cross-sectional view illustrating a heat dissipation module according to yet another embodiment of the invention.

FIG. 7 is a partial schematic cross-sectional view illustrating a heat dissipation module according to yet another embodiment of the invention. Referring to FIG. 7, differing from the previous embodiments where the step-like structure exhibiting a height difference is in the second sink 314, areas exhibiting a height difference are respectively disposed in corresponding sinks in this embodiment. Specifically, in a heat dissipation module 400 of this embodiment, an evaporator 410 includes a first sink 412 and a second sink 414. In addition, the first sink 412 has a supply space (a first space C1), whereas a second sink 414 includes an evaporation space (a second space C2). A pipe assembly 420 includes a first pipe member 421 and a second pipe member 422. In addition, the first pipe member 421 is connected between an outlet of the first sink 412 and an inlet of the second sink 414, and the second pipe member 422 is connected between an outlet of the second sink 414 and an inlet of the first sink 412. Here, only a part of the second pipe member 422 near the evaporator 410 is illustrated, and the rest is omitted. In addition, the first sink 412 and the second sink 414 are located on a virtual plane P3.

Accordingly, the second space C2 in the second sink 414 is an evaporation space with whole structure, whereas the first space C1 in the first sink 412 is a storage space with whole structure. In addition, there is a height difference (shown as a height difference ΔZ1 between the outlet of the first sink 412 and the inlet of the second sink 414 here as an example) between the second space C2 and the first space C1 along the Z-axis. Accordingly, in the flowing direction of the working fluid F, the first pipe member 421 is inclined from low to high. The working fluid F in liquid fills the first space C1 and a position where the first pipe member 421 and the first sink 412 are connected. Since the first pipe member 421 is inclined, the working fluid F in vapor is still unable to flow back to the first space C1. Also, with a force driving the working fluid F in vapor to flow from the first sink 412 toward the second sink 414 through the second sink 414, the working fluid F in vapor is still pushed back to the evaporation space (the second space C2) by the working fluid F in liquid. Thus, the working fluid F in vapor is still discharged out of the evaporator 410 from the outlet of the second sink 414, and consequently the working fluid F still flows unidirectionally. Besides, the heat pipe 130 and heat conductive pillars (not shown) of this embodiment are the same as those of the previous embodiments. Thus, details in this regard will not be repeated in the following.

Figure 8:
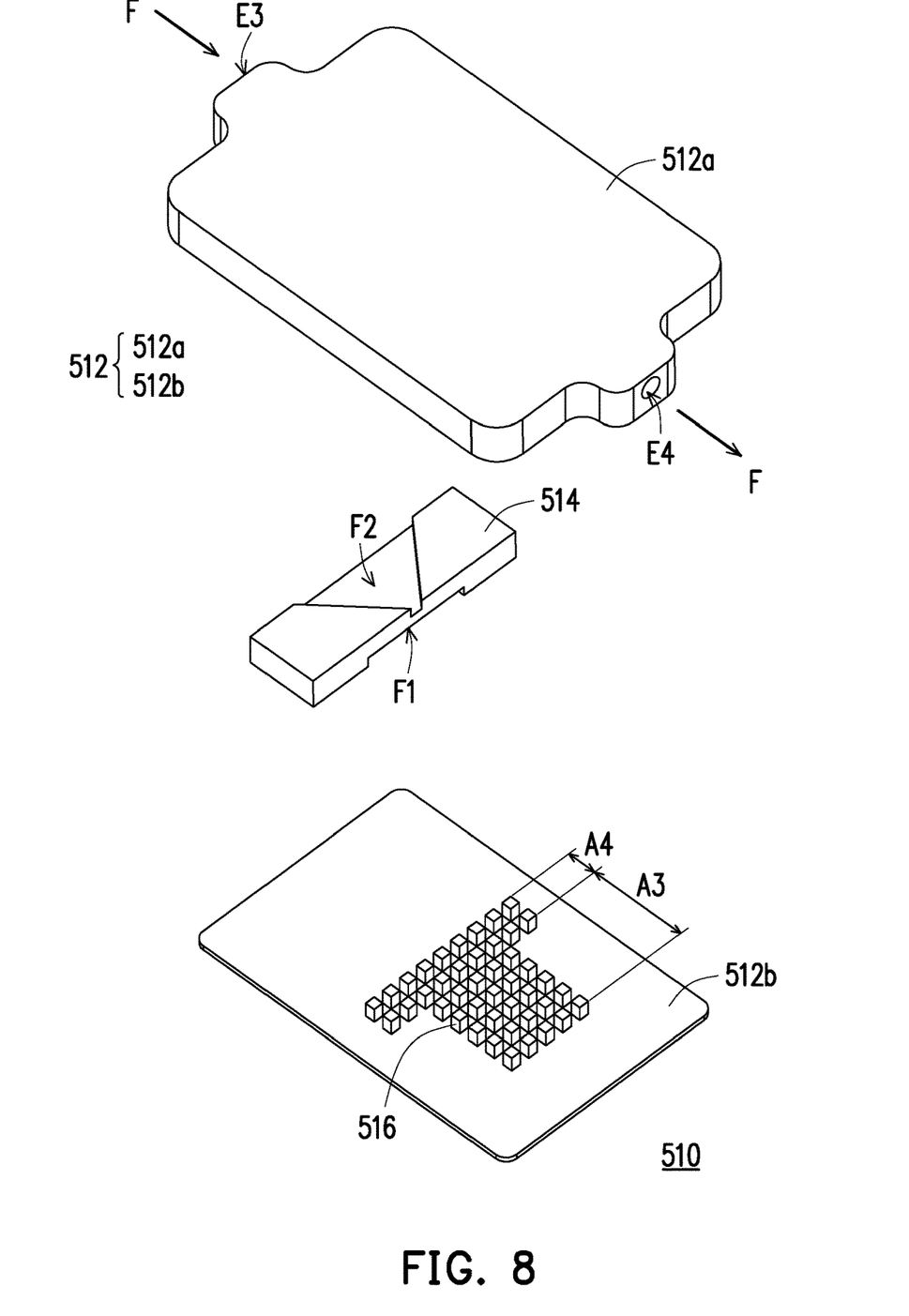
FIGS. 8 and 9 are respectively exploded views illustrating an evaporator according to still another embodiment of the invention.
Figure 9:
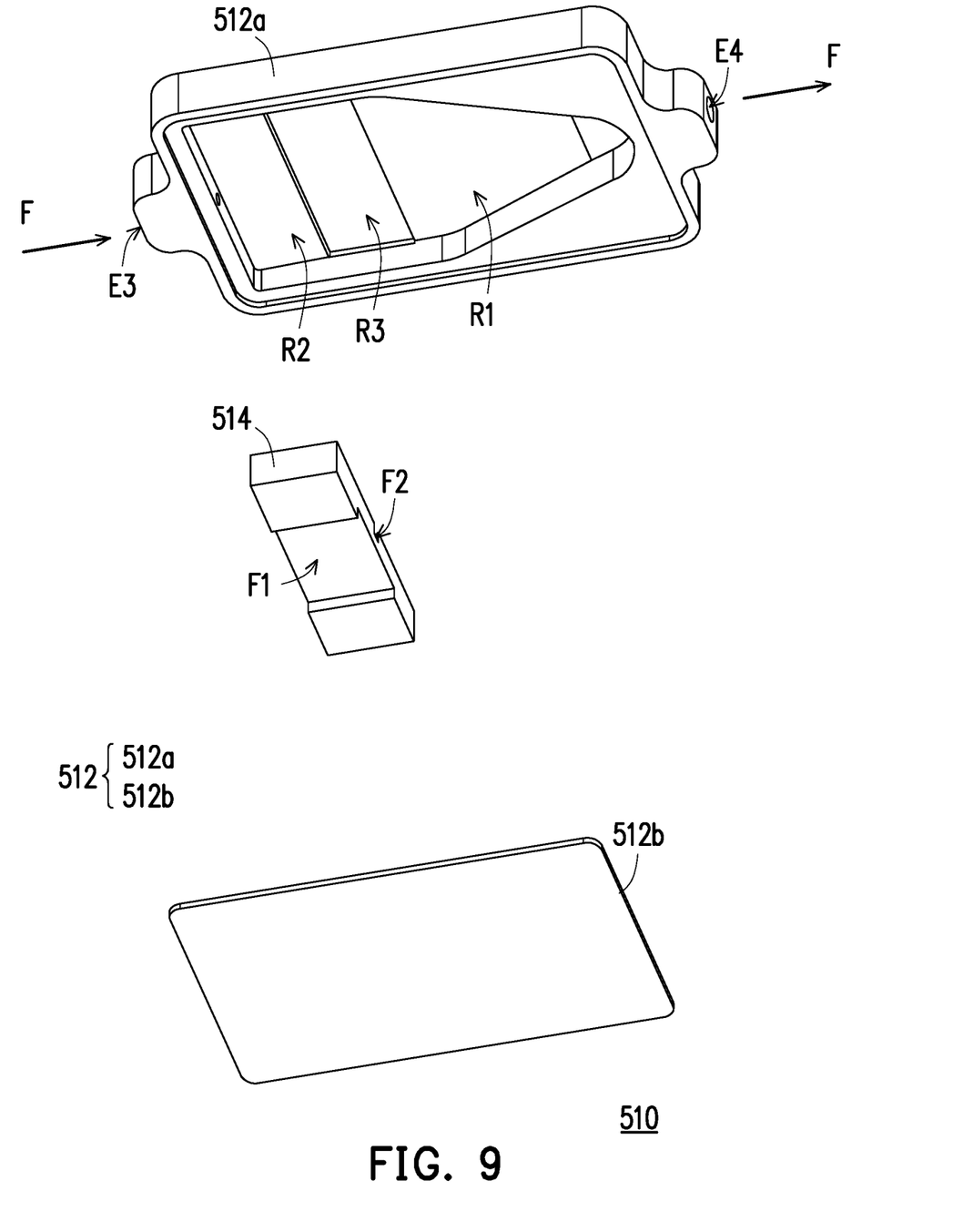
Figure 10:
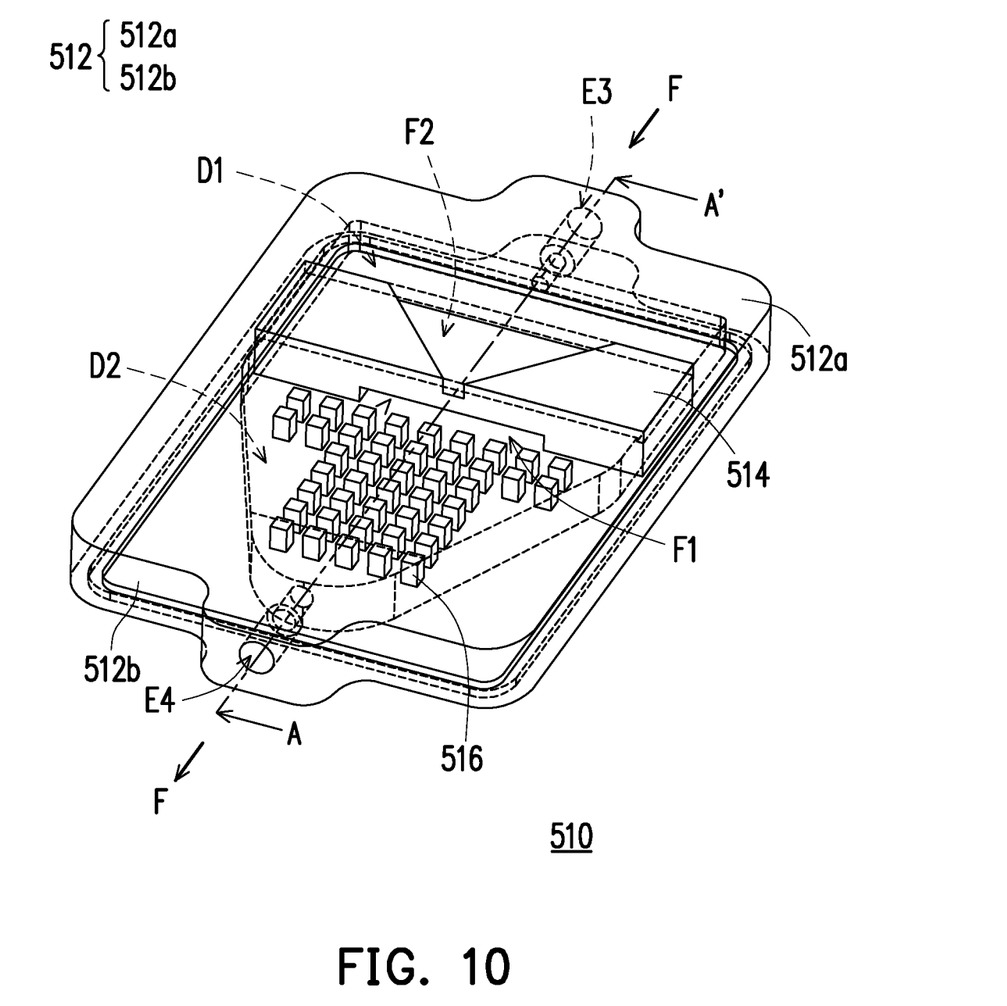
FIG. 10 is a perspective view illustrating the evaporator of FIGS. 8 and 9.
Figure 11:
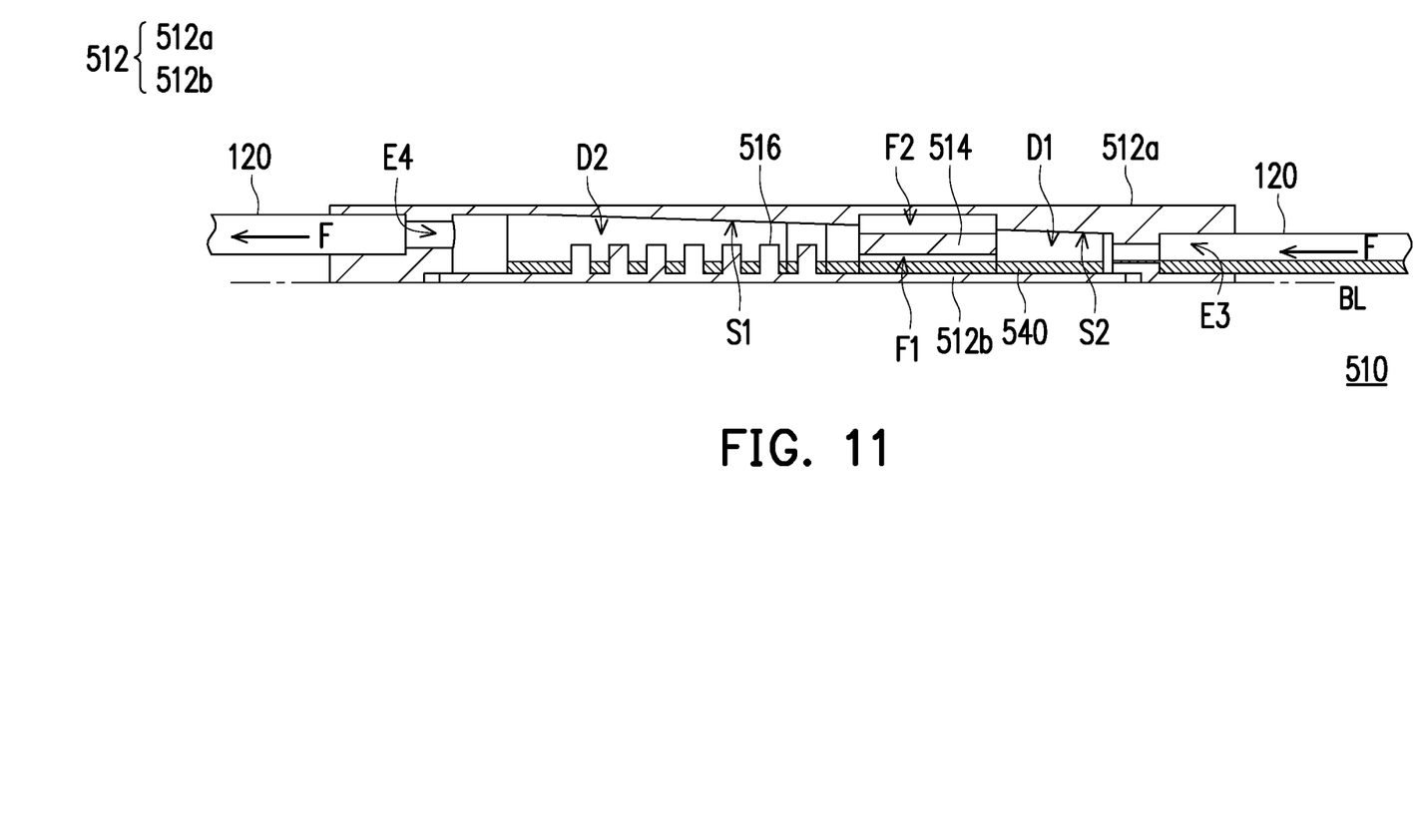
FIG. 11 is a cross-sectional view illustrating the evaporator of FIG. 10 along an A-A' line.

FIGS. 8 and 9 are respectively exploded views illustrating an evaporator according to still another embodiment of the invention. FIG. 10 is a perspective view illustrating the evaporator of FIGS. 8 and 9. FIG. 11 is a cross-sectional view illustrating the evaporator of FIG. 10 along an A-A' line. Referring to FIGS. 8 to 11, in this embodiment, an evaporator 510 includes a case 512 and a block 514 disposed in the case 512. In addition, the case 512 has an inlet E3 and an outlet E4. The block 514 is disposed in the case 512 to divide a cavity in the case 512 into a first space D1 and a second space D2. The block 514 has a first channel F1 to connect the first space D1 and the second space D2. In addition, the case 512 is formed by combining an upper case 512a and a lower case 512b through soldering or melting. The upper case 512a has the inlet E3 and the outlet E4.

In addition, the upper case 512a has a first recess R1, a second recess R2, and a third recess R3, and the second recess R2, the third recess R3, and the first recess R1 are arranged in sequence in a direction from the inlet E3 toward the outlet E4 (i.e., the flowing direction of the working fluid F). The first recess R1 and the second recess R2 form a top wall of the cavity after the upper case 512a and the lower case 512b are assembled. In addition, the third recess R3 is configured to accommodate the block 514 and make the second recess R2 and the lower case 512b a portion of the first space D1. Moreover, the first recess R1 and the lower case 512b form a portion of the second space D2. The heat source of the electronic device (as described in the previous embodiments, such as the heat source 20 of FIG. 2) substantially corresponds to the second space D2 of the evaporator 510. Namely, the heat generated by the heat source may be transferred to the second space D2 via the heat pipe or through direct contact. In this way, the working fluid F in liquid in the second space D2 may absorb heat and be transformed to become the working fluid in vapor and flow to the pipe assembly 120 (a portion of the pipe assembly is shown in FIG. 11, and a complete illustration may be referred to the previous embodiments) from the outlet E4. The first channel F1 is adjacent to the lower case 512b and connects the first space D1 and the second space D2, such that the working fluid F in liquid is able to flow from the first space D1 toward the second space D2 to supplement the working fluid F undergoing transformation in the second space D2.

Referring to FIG. 11, specifically, the heat dissipation module of this embodiment further includes a capillary medium 540. In addition, a portion of the capillary medium 540 is disposed in the first space D1 and the second space D2 and through the first channel F1, while another portion of the capillary medium 540 is extensively disposed in the first space D1 and the pipe assembly 120. In this embodiment, the capillary medium 540 may be selected from a porous material, a powder metallurgy material, a porous sintered body, a porous foaming body, a porous carbonized body, etc., and it shall be understood that the invention does not intend to impose a limitation in this regard. In addition, the powder metallurgy material or the porous sintered body may be selected from silver, copper, aluminum alloy, or other suitable metal or alloy materials.

Accordingly, after the heat of the heat source is transferred to the second space D2 to heat the working fluid F in liquid in the space and transform the working fluid F in liquid into the working fluid F in vapor, the presence of the capillary medium 540 allows the working fluid F in liquid in the first space D1 to, through absorption and guiding of the capillary medium 540, pass through the first channel F1 and be transferred to the second space D2. In this way, the working fluid F in the second space D2 may continuously absorb heat and undergoes transformation. In addition, the working fluid F in liquid at the pipe assembly 120 may also be continuously transferred to the first space D1 through the capillary medium 540. In this way, the working fluid F in liquid is able to be continuously supplied from the pipe assembly 120 and the first space D1 to the second space D2. In addition, such arrangement also provides a driving force to allow the working fluid F to flow in the pipe assembly 120 and the first space D1 and the second space D2 of the evaporator 510.

In addition, as shown in FIG. 11, a height of the inlet E3 relative to a bottom BL of the lower case 512b is lower than a height of the outlet E4 relative to the bottom BL of the lower case 512b. Therefore, the working fluid F in liquid is able to smoothly flow to the first space D1 from the inlet E3, and the working fluid F in vapor is able to smoothly flow out of the evaporator 510 from the second space D2. In other words, with a configuration on the heights of the inlet E3 and the outlet E4 (relative to the bottom BL), the flowing direction of the working fluid F is able to be controlled effectively. Namely, the working fluid F in liquid flows into the evaporator 510 from the lower inlet E3, and the working fluid F in vapor is discharged from the higher outlet E4, so as to meet a characteristic of single circulation of the working fluid F in the closed loop and prevent the working fluid F in vapor from flowing back. Moreover, in this embodiment, a diameter of the inlet E3 is smaller than a diameter of the outlet E4. Such configuration also results in a pressure difference in an internal space of the evaporator 510, thereby facilitating circulation of the working fluid F in the loop.

In addition, referring to FIGS. 8 to 10, in this embodiment, the second space D2 (i.e., a space formed after the first recess R1 of the upper case 512a is combined with the lower case 512b) is in a profile gradually convergent from the block 514 toward the outlet E4, so that the working fluid F in vapor in the second space D2 are converged and directed toward the outlet E4. In addition, the block 514 further has a second channel F2 adjacent to the upper case 512a and connecting the first space D1 and the second space D2. In other words, the second channel F2 is located above the first channel F1. The second channel F2 has a profile gradually convergent from the first space D1 toward the second space D2, so as to converge and guide the working fluid F in vapor in the first space D1 toward the second space D2 and prevent the working fluid F is vapor in the second space D2 from flowing back to the first space D1.

Referring to FIGS. 9 and 11 again, in this embodiment, the first recess R1 of the upper case 512a has a first surface S1 facing the lower case 512b, and the second recess R2 has a second surface S2 facing the lower case 512b. In addition, the first surface S1 and the second surface S2 are inclined with respect to the bottom BL of the lower case 512b from the inlet E3 toward the outlet E4. As shown in FIG. 11, a side of the second surface S2 close to the inlet E3 is lower, whereas a side of the first surface S1 close to the outlet E4 is higher. Therefore, a configuration of heights corresponding to the inlet E3 and the outlet E4 (i.e., a state where the right side is lower and the left side is higher in the figure) is shown. Accordingly, the space of the second space D2 is larger than the space of the first space D1, so the second space D2 is consequently able to accommodate more of the working fluid F in vapor. In addition, due to an inclined arrangement of the first surface S1 and the second surface S2, an effect of movement of guiding the working fluid F from the inlet E3 toward the outlet E4 is facilitated.

Besides, referring to FIGS. 8, 10, and 11, the evaporator 510 further includes a plurality of heat conductive pillars 516 disposed on a surface of the lower case 512b and located in the second space D2. The heat conductive pillars 516 are divided into the heat conductive pillars 516 of a third space A3 and the heat conductive pillars 516 of a fourth space A4 based on locations of the heat conductive pillars 516 in the lower case 512b. A profile of the heat conductive pillars 516 in the third space A3 is consistent with a profile of an orthogonal projection of the heat source (shown in FIG. 2) on the lower case 512b (or the profile of the heat conductive pillars 516 is consistent with a profile of an orthogonal projection of the heat pipe and a contact end of the evaporator 510 on the lower case 512b), and the heat conductive pillars 516 in the fourth space A4 are located between the block 514 and the heat conductive pillars 516 in the third space A3. In other words, the heat conductive pillars 516 that are divided may be considered as being divided into the heat conductive pillars 516 of a primary heating area (i.e., the third space A3) that directly corresponds to the heat source and the heat conductive pillars 516 of a secondary heating area (i.e., the fourth space A4) that does not correspond to the heat source. In addition, structures of the heat conductive pillars 516 are configured to absorb heat from the heat source and heat the working fluid F of the second space D2 accordingly.

Consequently, most of the working fluid F in vapor in the second space D2 may be generated by heating the working fluid F in liquid with the heat conductive pillars 516 in the third space A3. Since the conductive pillars 516 in the fourth space A4 do not directly correspond to the heat source, the working fluid F in vapor generated by heating the working fluid F in liquid with the conductive pillars 516 in the fourth space A4 is less than that generated with the heat conductive pillars 516 in the third space A3. Accordingly, the working fluid F in vapor in the primary heating area (the third space A3) may flow toward the outlet E4 along the inclined first surface S1, and a pressure above the primary heating area consequently becomes lower, thereby guiding the working fluid F in vapor above the secondary heating area to move toward the primary heating area. In the meantime, since the working fluid F in vapor in the secondary heating area is not as much and robust as that in the primary heating area, the working fluid F in vapor in the secondary heating area is less easy to be filled into the block 514 having the second channel F2 and may thus be guided to the outlet E4 more easily due to a lower pressure in the primary heating area, so that the working fluid F in vapor in the evaporator 510 has a preferable uni-directional circulation.

It should also be noted that the block 514 of this embodiment is a bad heat conductor. Thus, the heat generated by the heat source is absorbed only in the second space D2 to prevent over-vaporization of the working fluid F in liquid in the first space D1.

In view of the foregoing, in the embodiments of the invention, the loop of the heat dissipation module is formed by combining the evaporator and the pipe assembly, and the working fluid is filled into the loop, so that the heat is absorbed and dissipated through transformation of the working fluid. In addition, the cavity of the evaporator is divided into different spaces, such that the heat source only transfers heat to one of the spaces through the heat pipe, whereas the working fluid in another space remains in the liquid phase to be supplied to a heat absorption space. Namely, the evaporator is substantially divided into the evaporation space that absorbs heat and the buffer space storing the working fluid in liquid, thereby ensuring that the working fluid in liquid required by the evaporator is continuously supplied. Here, in addition to separating the cavity of the evaporator using the block, the evaporator may be substantially divided into two separate sinks, thereby having the evaporator divided into spaces.

In addition, with the capillary medium disposed at a condensing segment of the pipe assembly and the evaporator, when the working fluid is transformed due to absorption of heat and is reduced, the working fluid in liquid may be provided to the space where heat is absorbed from another space through guiding of the condensing segment of the pipe assembly. Accordingly, the working fluid is able to smoothly flow continuously in the case and the pipe. Even if the heat dissipation assembly is disposed in a horizontal arrangement in accordance with the electronic device, the circulation for heat dissipation may continue without being influenced by gravity.

Moreover, there is a difference in height between the spaces. For example, the evaporator or the inlet and the outlet of the pipe assembly are provided with a path that has a difference in height for the working fluid to pass through, such that the working fluid flows out of the evaporator uni-directionally when the working fluid absorbs heat and is transformed from the liquid phase into the vapor phase. Furthermore, the working fluid in gas is prevented from flowing back due to the height difference. Therefore, the working fluid's characteristic of being driven uni-directionally in the loop is able to be maintained effectively.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A heat dissipation module, comprising:
an evaporator, having an internal space divided into a first space and a second space different from each other;
a pipe assembly, assembled to the evaporator to form a loop, the loop filled with a working fluid, wherein the working fluid in liquid state receives heat in the second space and flows to the pipe assembly after being transformed into vapor state, and the working fluid in vapor state flows into the first space after being transformed into liquid state by dissipating heat in the pipe assembly, and is stored in the first space to be supplied to the second space,
wherein the evaporator has an inlet and an outlet, and there is a height difference between the first space and the second space, the second space being higher than the first space, and the outlet being higher than the inlet;
a heat pipe, wherein one end of the heat pipe receives heat, another end of the heat pipe is connected to an external part of the evaporator and faces the second space, and the another end of the heat pipe contacts a recessed structure of the external part,
wherein the external part of the evaporator and an internal part of the evaporator are consistently in a step structure to form the recessed structure; and
a plurality of heat conductive pillars, disposed in the second space, wherein the heat conductive pillars are divided into a first part and a second part, and the second part is located between a block and the first part.

2. A heat dissipation module, comprising:
an evaporator, having an internal space divided into a first space and a second space different from each other;
a pipe assembly, assembled to the evaporator to form a loop, the loop filled with a working fluid, wherein the working fluid in liquid state receives heat in the second space and flows to the pipe assembly after being transformed into vapor state, and the working fluid in vapor state flows into the first space after being transformed into liquid state by dissipating heat in the pipe assembly, and is stored in the first space to be supplied to the second space,
wherein the evaporator has an inlet and an outlet, and there is a height difference between the first space and the second space, the second space being higher than the first space, and the outlet being higher than the inlet; and a heat pipe, wherein one end of the heat pipe receives heat, another end of the heat pipe is connected to an external part of the evaporator and faces the second space, and the another end of the heat pipe contacts a recessed structure of the external part, wherein the external part of the evaporator and an internal part of the evaporator are consistently in a step structure to form the recessed structure wherein the evaporator has a capillary medium connecting the first space and the second space, and the working fluid in liquid state is suitable to be transferred from the second space to the first space by the capillary medium.

3. The heat dissipation module as claimed in claim 2, wherein the evaporator comprises:

a case having an inlet and an outlet; and a block disposed in the case to form the first space and the second space, wherein the block has a first channel to connect the first space and the second space, and at least a portion of the capillary medium is disposed in the first space and the second space and through the first channel.

4. The heat dissipation module as claimed in claim 3, wherein the second space is in a profile gradually convergent from the block toward the outlet.

5. The heat dissipation module as claimed in claim 3, wherein the case comprises:

an upper case, having the inlet and the outlet; and a lower case, assembled to the upper case, wherein the block is held between the upper case and the lower case, the first channel is adjacent to the lower case, and the lower case receives heat.

6. The heat dissipation module as claimed in claim 5, wherein the block further has a second channel adjacent to the upper case and connecting the first space and the second space, and the second channel is in a profile gradually convergent from the first space toward the second space, so as to guide the working fluid in vapor state in the first space to the second space and prevent the working fluid in vapor state in the second space from flowing back to the first space.

7. The heat dissipation module as claimed in claim 5, wherein the upper case has three additional recesses, and the three additional recesses comprise a second recess, a third recess, and a first recess sequentially arranged in a direction from the inlet toward the outlet, the block abuts the third recess, the first recess corresponds to the second space, and the second recess corresponds to the first space.

8. The heat dissipation module as claimed in claim 7, wherein the first recess has a first surface facing the lower case, the second recess has a second surface facing the lower case, and the first space and the second space are inclined with respect to the lower case from the inlet toward the outlet.

9. The heat dissipation module as claimed in claim 3, wherein another portion of the capillary medium is extensively disposed from the pipe assembly to the first space, so as to transfer the working fluid in liquid state to the first space.

* * * * *